US006864829B2

(12) United States Patent
Bervoets et al.

(10) Patent No.: US 6,864,829 B2
(45) Date of Patent: Mar. 8, 2005

(54) SYSTEM FOR DETERMINING A POSITION OF A MOVING TRANSPONDER

(75) Inventors: Alfonsus Maria Bervoets, Bentveld (NL); Fransciscus Robertus A. C. Hin, Neerpelt (BE)

(73) Assignee: AMB IT Holding B.V. (NL)

( * ) Notice: Subject to any disclaimer, the term of this patent is extended or adjusted under 35 U.S.C. 154(b) by 0 days.

(21) Appl. No.: 10/367,121

(22) Filed: Feb. 14, 2003

(65) Prior Publication Data

US 2004/0160355 A1 Aug. 19, 2004

(51) Int. Cl.[7] .......................... G01S 15/74; G01S 13/08
(52) U.S. Cl. ........................................... 342/46; 342/50
(58) Field of Search ..................................... 342/42–51

(56) References Cited

U.S. PATENT DOCUMENTS

| | | | | | |
|---|---|---|---|---|---|
| 5,311,185 | A | * | 5/1994 | Hochstein et al. | 342/44 |
| 5,666,101 | A | | 9/1997 | Cazzani et al. | 340/323 |
| 5,842,118 | A | * | 11/1998 | Wood, Jr. | 455/101 |
| 5,887,176 | A | * | 3/1999 | Griffith et al. | 713/320 |
| 6,219,613 | B1 | | 4/2001 | Terrier et al. | 701/207 |
| 6,261,247 | B1 | | 7/2001 | Ishikawa et al. | 600/587 |

FOREIGN PATENT DOCUMENTS

| | | |
|---|---|---|
| EP | 0 568 066 A1 | 11/1993 |
| FR | 2 619 644 | 2/1989 |
| WO | WO 00/19235 | 4/2000 |
| WO | WO 01/03057 A1 | 1/2001 |
| WO | WO 02/101408 | 12/2002 |

OTHER PUBLICATIONS

Cenker et al., "Iterative Algorithms in Irregular Sampling: A First Comparison of Methods", In Proceedings of ICCP/91, pp. 483–489, 1991.

* cited by examiner

*Primary Examiner*—Bernarr E. Gregory
*Assistant Examiner*—Brian K Andrea
(74) *Attorney, Agent, or Firm*—Westman, Champlin & Kelly, P.A.; S. Koehler

(57) ABSTRACT

The invention relates to a system for determining a position of a moving transponder adapted to receive a substantially stationary magnetic field signal and to transmit a further signal. The system comprises a signal generating arrangement adapted to generate said stationary magnetic field signal for said transponder, said transponder being adapted to determine a plurality of signal strengths of said received magnetic field signal; at least one signal receiving arrangement, adapted to receive said further signal of said transponder, said transponder being adapted to insert at least one message portion in said further signal indicative of at least one of said plurality of signal received signal strengths and processing means adapted to determine said position in accordance with a plurality of said received signal strengths determined by said moving transponder. This further signal can e.g. be an electromagnetic signal of high frequency that has a high bandwidth enabling the use of a large number of transponders in a sporting event. Furthermore, the power of an electromagnetic signal decreases less rapidly with the distance travelled, such that the high frequency signal can be received at a further distance from the transponder.

16 Claims, 3 Drawing Sheets

SYSTEM FOR DETERMINING A POSITION OF A MOVING TRANSPONDER

BACKGROUND OF THE INVENTION

The invention relates to a system for determining a position of a moving transponder.

Many areas of sports require determination of position and/or time of the participants, including car racing, athletics and skating. To achieve such a determination the participants carry a transponder being in communicative connection with measuring stations.

FR 2 619 644 discloses a detection system for detecting the time of cars in a car racing event. The cars each have a transponder emitting signals that are received by a receiving unit. The transponders receive magnetic field signals from an antenna loop in the track. The receiving unit determines the time of passing of the cars by manipulating the received signal, which has a frequency in the range of 2–3 MHz.

The prior art system is problematic in that the transmitted magnetic signals only have a small bandwidth, since magnetic coupling requires a relatively low carrier frequency. Such a relatively small bandwidth puts restrictions on the number of transponders that can be employed in a sporting event. Moreover limitations exist as to the distance for detection of the signal of the transponder since the power of these magnetically transmitted signals decreases rapidly with the distance to the antenna.

However, employing an electromagnetic transmission method is problematic as well. The unit receiving such electromagnetic signals will often not be able to determine a position of the transponder, since these electromagnetic signals show a highly irregular pattern, mainly as a result of multi-path effects associated with electromagnetic signals of relatively high frequency.

It is therefore desirable to provide a system employing a high bandwidth while still being able to determine the position and/or passing time of a transponder.

SUMMARY OF THE INVENTION

To this end a system is provided for determining a position of a moving transponder adapted to receive a substantially stationary magnetic field signal and to transmit a further signal, said system comprising:

- a signal generating arrangement adapted to generate said stationary magnetic field signal for said transponder, said transponder being adapted to determine a plurality of signal strengths of said received magnetic field signal;
- at least one signal receiving arrangement, adapted to receive said further signal of said transponder, said transponder being adapted to insert at least one message portion in said further signal indicative of at least one of said plurality of received signal strengths;
- processing means adapted to determine said position in accordance with a plurality of said received signal strengths determined by said moving transponder.

By inserting the received signal strength in a message portion of the further signal, the character of the further signal itself is no longer relevant for the position determination of the moving transponder. The position determination is performed on the basis of received signal strengths, incorporated in the message portion(s) of the further signal. As a result, the further signal can thus be optimised with respect to e.g. the bandwidth. This further signal can e.g. be an electromagnetic signal of high frequency that has a high bandwidth enabling the use of a large number of transponders in a sporting event. Furthermore, the power of an electromagnetic signal decreases less rapidly with the distance travelled, such that the high frequency signal can be received at a further distance from the transponder.

In a preferred embodiment of the invention, the signal generating arrangement and the signal receiving arrangement are decoupled from each other. In prior art systems a common antenna is usually employed for generation and reception of the signal. By using an electromagnetic signal the distance between the transponder and the signal receiving arrangement can be made larger as explained above. Consequently the signal receiving arrangement can be decoupled from the signal generating arrangement, allowing individual optimisation of both arrangements for their specific tasks. A conventional antenna arrangement can e.g. be used as antenna of the signal receiving arrangement.

In a further embodiment of the invention, the transponder is adapted to insert a further message portion in the further signal that comprises additional data. Such additional data can be accommodated in the further signal as a result of the higher available bandwidth of the further signal. These additional data may e.g. relate to an identification code of the signal generating arrangement. This may e.g. be advantageous in the case of multiple signal generating arrangements being used along a track in order to e.g. provide information of the specific signal generating arrangement being passed by the transponder. Alternatively, or in addition, the additional data may relate to a variable of and/or concerning an object associated with the transponder. It can e.g. be envisaged that a variable relating to telemetric data, such as the heart rate of an athlete, is probed by a sensor and transmitted as additional data to the processing unit.

It is noted that the above embodiments, or aspects thereof, may be combined.

The invention further relates to a transponder being adapted for receiving a substantially stationary magnetic field signal, for determining a signal strength of said received magnetic field signal and for transmitting a further signal having inserted at least one message portion indicative of at least one determined received signal strength.

In an embodiment of the invention, the transponder is assigned an identification code and adapted to insert this identification code in a further message portion of the further signal. As a result, information is available with regard to the identity of the source of the further signal.

In an embodiment of the invention, the transponder comprises an encryption module for encrypting the further signal. The encryption module may apply an encryption scheme or algorithm suitable for preventing e.g. misuse of the system whereby introducing falsified messages by a device similar to transponders of the invention can suggest a position and thus passing time of transponders in reality not in that position.

The invention further relates to a transponder signal transmitted by a transponder to a signal receiving arrangement in response to reception of a substantially stationary magnetic field signal from a signal generation arrangement, said signal comprising at least one message portion indicative of at least one signal strength of said received magnetic field signal. The transponder signal may further comprise message portions relating to an identification code of the signal generating arrangement and/or an identification code of the transponder and/or a variable concerning an object associated with the transponder. The transponder signal may be encrypted.

The invention will be further illustrated with reference to the attached drawing, which shows a preferred embodiment according to the invention. It will be understood that the system according to the invention is not in any way restricted to this specific and preferred embodiment.

DETAILED DESCRIPTION OF A PREFERRED EMBODIMENT

Figure 1:
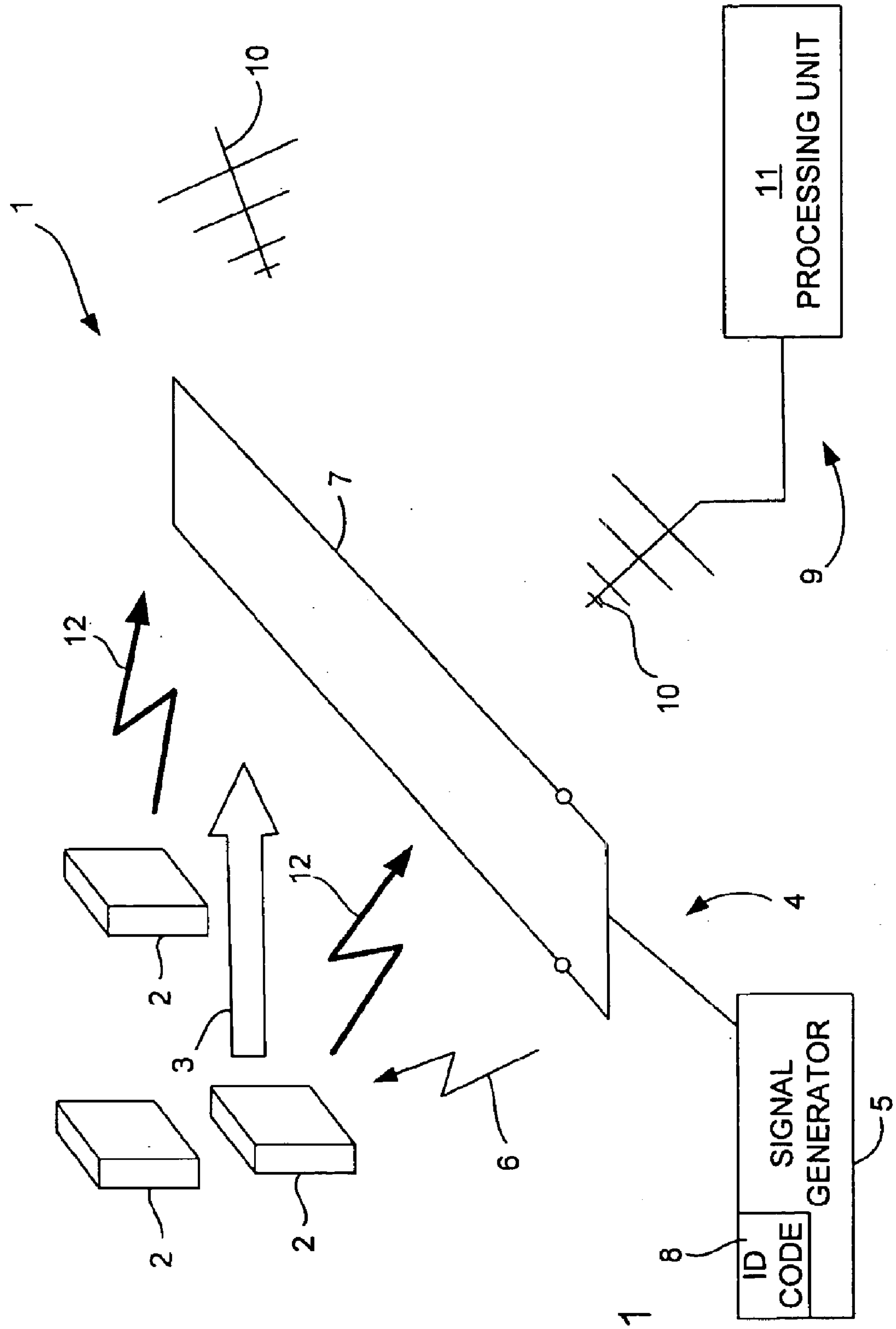
FIG. 1 shows a system for determining a position of a moving transponder according to an embodiment of the invention.

With reference to FIG. 1, there is shown a system 1 for determining a position of a moving transponder 2. In FIG. 1 three transponders 2 are shown moving in the direction of the arrow 3. However according to the invention a large number of transponders 2 can be employed.

Figure 2:
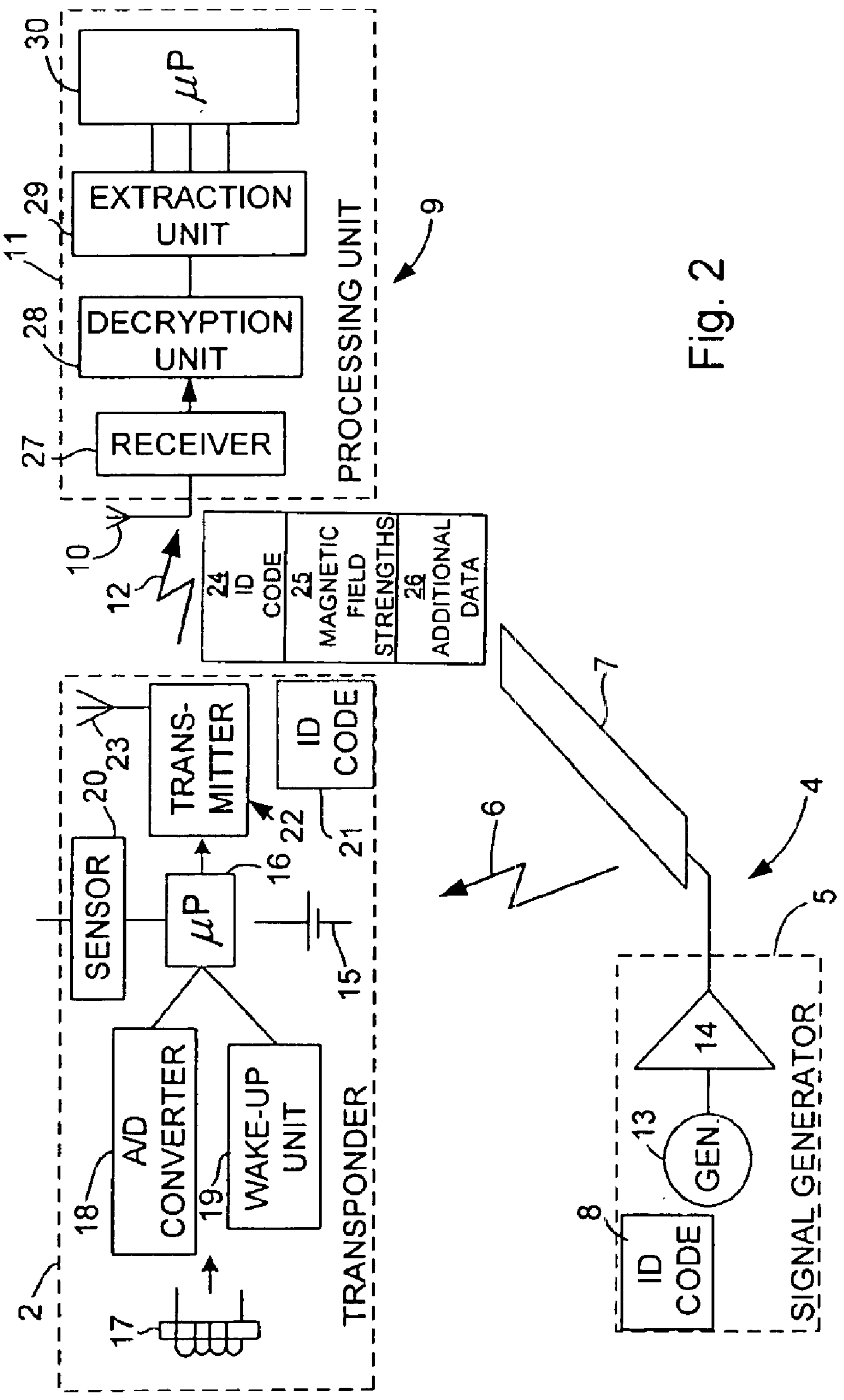
FIG. 2 schematically shows several components of the system as displayed in FIG. 1.

The system 1 comprises a signal generating arrangement 4 having a signal generator 5 transmitting substantially stationary magnetic field signals 6 via a loop 7. Such a loop 7 is often positioned such that participants carrying the transponders 2 in a sporting event are obliged to pass this loop 7. Loop 7 may e.g. be a single wire embedded in or hanging over e.g. a circuit track. The frequency of the magnetic field signals 6 is in the order of 100 kHz, e.g. 125 kHz. The power of these signals 6 is generally limited by regulatory requirements. The power used allows the components of the transponder 2, as shown in FIG. 2, to be of standard quality. The signal generating arrangement 4 may have been assigned an identity code, schematically indicated by 8.

The system 1 further comprises a signal receiving arrangement 9 having an antenna 10 and a processing unit 11. The signal receiving arrangement 9 is adapted to receive and process a further signal 12 transmitted by the transponders 2.

As used herein, the signal 6 and the further signal 12 comprise computer readable media for they embody data in a modulated data signal such as a carrier wave or other transport mechanism. The term "modulated data signal" means a signal that has one or more of its characteristics set or changed in such a manner as to encode information in the signal. By way of example, and not limitation, this form of computer readable media includes wireless media such as acoustic, RF, infrared and other wireless media. Combinations of any of the above should also be included within the scope of computer readable media. In one embodiment, the further signal 12 preferably is an electromagnetic signal. The frequency of the signal 12 is preferably in the range of 0.4–6 GHz, more preferably in the range of 0.4–1.0 GHz, e.g. 433, 868 or 915 MHz.

The signal generating arrangement 4 and the signal receiving arrangement 9 are separate arrangements. As a result both arrangements 4, 9 can be optimised individually for their specific tasks. For the signal generating arrangement 4, the loop 7 may e.g. be of considerable dimensions, e.g. 50 meters in length. Since the loop 7 is no longer used for detection of signals but solely for generation of the magnetic field signal 6 of relatively low frequency, larger loops 7 are allowed since noise and wavelength considerations for receiving signals are no longer relevant.

Note that the system 1 may comprise further signal generating arrangements 4 and/or signal receiving arrangements 9 in communicative connection with individual or shared signal generators 5 and processing units 11 respectively.

In FIG. 2 a more detailed view is provided of several components of the system 1 as shown in FIG. 1.

The signal generating arrangement 4 comprises a relatively low frequency signal generator 5 having a signal generator 13 and an amplifier 14. Further an identification code 8 is assigned to the signal generating arrangement 4, such that this identification code 8 may be inserted in the magnetic field signal 6 transmitted via the loop 7.

The transponder 2 comprises a battery 15 for power supply of a microprocessor 16. The transponder 2 further comprises an arrangement 17, such as a pick-up coil, suitable for receiving the magnetic field signal 6 of relatively low frequency of the loop 7. The magnetic field signal 6 received by the pick-up coil 17 is fed to an A/D converter 18 to enable processing of the signal 6 by the microprocessor 16. Furthermore the transponder 2 comprises a wake-up unit 19 for activation of the transponder 2 in the neighbourhood of the signal generating arrangement 4. The unit 19 may be awoken in accordance with the strength of the signal 6 induced in pick-up coil 17. Microprocessor 16 determines the signal strength of the signal 6 which is an indication of the power of the received signal 6 and so a measure for the distance to the loop antenna 7 in the track. This determination may be performed at irregular intervals and subsequently transmitted at the same irregular intervals by the transponder 2 to the signal receiving arrangement 9. Moreover the transponder 2 may have a sensor 20 feeding additional data to the microprocessor 16. These additional data may e.g. relate to telemetric data of an athlete carrying the transponder 2. Further an identity code 21 may have been assigned to the transponder 2. Finally transponder 2 comprises a transmitter 22 and an antenna 23 for transmitting the electromagnetic signal 12 of relatively high frequency. The electromagnetic signal 12 comprises message portions 24, 25, 26. The microprocessor 16 may insert these message portions 24, 25 and 26 in the electromagnetic signal 12. In FIG. 2, these message portions 24, 25 and 26 respectively relate to or are indicative of the identity code 21 of the transponder 2, the determined signal strength and the additional data. These additional data may e.g. relate to the identity code 8 of the signal generating arrangement 4 and/or the heart rate, obtained by the sensor 20, of a user carrying the transponder 2. The complete message or portion thereof may be encrypted by e.g. the microprocessor 16 to prevent e.g. fraudulent use by generating similar signals by a third party.

It is noted that the transponder 2 may transmit electromagnetic signals 12 the identical message portions 24 and/or 25 and/or 26 several times during passing of the loop 7. Moreover one electromagnetic signal 12 may comprise a message portion 25 that comprises several determined signal strengths associated with different times of passing the loop 7.

The signal receiving arrangement 9 comprises an antenna 10 and a processing unit 11. Processing unit 11 comprises a receiver 27 for receiving the electromagnetic signal 12 of the transponder 2. Moreover the processing unit 11 comprises an optional decryption unit 28 for decrypting the encrypted electromagnetic signals 12. Subsequently the message portions 24, 25 and 26 will be extracted by an extraction unit 29 from the electromagnetic signal 12. The extracted message portions 24, 25 and 26 are input to a microprocessor 30 suitable for analysing the message portions 24, 25 and 26. It is noted that the functions of the units 28 and/or 29 may be performed by the microprocessor 30 as well.

Next, the operation of the system 1 as displayed in FIGS. 1 and 2 will be described in view of FIGS. 3A and 3B.

Figure 3B:
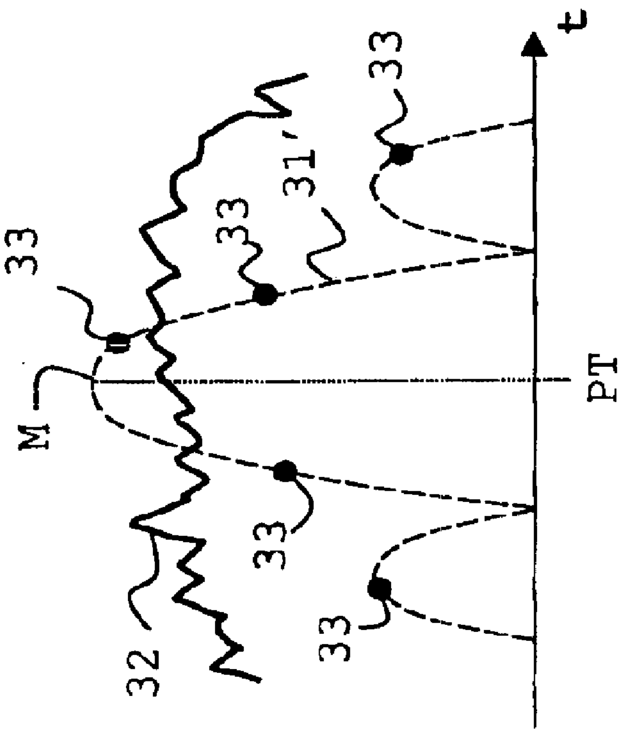
FIGS. 3A and 3B show signal characteristics associated with the system shown in FIGS. 1 and 2.
Figure 3A:
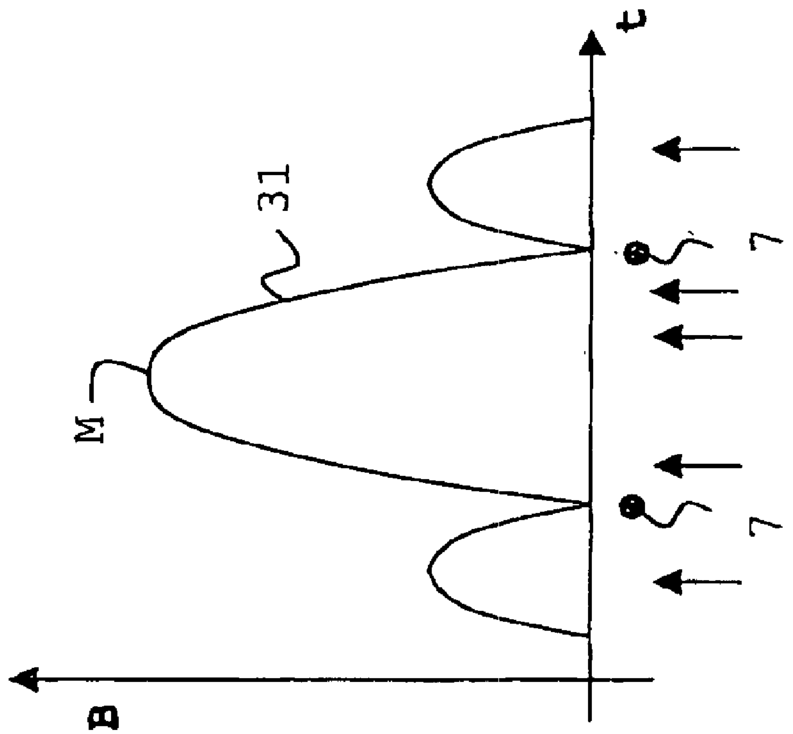

In FIG. 3A a signal pattern 31 representing the magnetic signal 6 of relatively low frequency is displayed as generated by the signal generating arrangement 4 and received by the transponder 2 as a function of time. It is noted that time and position are comparable in passing the loop 7. The signal pattern 31 is a result of the loop 7. Between the wires of the loop 7, schematically illustrated on the horizontal axis in FIG. 3A, the signal is more pronounced than outside of the loop 7, as indicated by the side lobes of smaller height. Nulls of the signal pattern 31 correspond to the position directly above the wires of the loop 7. The transponder 2 determines the received magnetic field strength of the magnetic field signal 6 as described with regard to FIG. 2, at irregular time intervals as indicated by the arrows on the horizontal axis. The amount of samples taken of the magnetic field strength is variable and depends e.g. on the speed of the moving transponder 2 and the way the microprocessor 16 is programmed. Microprocessor 16 may be programmed to sample the received magnetic field strengths at random time intervals. As an example the resulting amount of samples taken ranges typically from 20 for car racing to 200 for an athlete walking for one passing of the loop 7. For the sake of simplicity the amount of samples taken is limited to five in FIG. 3A.

In FIG. 3B two signal patterns are displayed for explanation purposes. The electromagnetic signal 12 of high frequency, transmitted by the transponder 2, is indicated by 32. It is clear that from this pattern 32 no time or position for passing the loop 7 can be determined. The irregular pattern 32 is mainly a result of multi-path effects. Since in the electromagnetic signal 12, message portion 25 comprises an indication of the received signal strength of the magnetic field signal 6, a number of points 33 of the magnetic signal pattern 31 are known at the processing unit 11. From these points 33 a position determination pattern 31', corresponding to the magnetic field signal pattern 31, can be constructed or reconstructed. From this position determination pattern 31', the position on the loop and thus the moment PT of passing of the loop 7 can be analyzed by the microprocessor 29. It is noted that in a practical situation the samples may be taken and/or analyzed only near the maximum N of the signal patterns 31 and 31', since only this part of the pattern 31' is relevant for the determination of the time the transponder 2 passes the loop 7. The microprocessor 30 may further analyze further message portions 24, 26 incorporated in electromagnetic signal 12, such as the identity of the transponder 2, the identity code of the signal generating arrangement 4 from which the magnetic field signal 6 has been received (identity code 8) and/or variables of and/or concerning the object carrying the transponder 2 (by using sensor 20).

The invention enables e.g. a competitor in a race to wear the transponder 2 on his shirt instead of on his shoe, since the character of the further signal 12 is not essential for the position determination of the competitor. The further signal can thus be made suitable for detection on a larger distance, while still being able to be used for position determination by virtue of the incorporated message portion 24 with 'position information'. By inserting the received signal strength of the magnetically induced signal 6 in a message portion of the electromagnetic signal 12, determination of time and/or position can be achieved. This behavior allows for having the loop 7 deeper in a circuit track, which is e.g. advantageous in snowy conditions.

What is claimed is:

1. System for determining a position of a moving transponder adapted to receive a substantially stationary magnetic field signal and to transmit a further signal, said system comprising:

a signal generating arrangement adapted to generate said stationary magnetic field signal for said transponder, said transponder being adapted to determine a plurality of signal strengths of said received magnetic field signal;

at least one signal receiving arrangement, adapted to receive said further signal of said transponder, said transponder being adapted to insert said plurality of received signal strengths in one or more message portions of said further signal;

processing means adapted to determine said position in accordance with a plurality of said received signal strengths determined by said moving transponder.

2. System according to claim 1, wherein said further signal is an electromagnetic signal of relatively high frequency.

3. System according to claim 2, wherein said relatively high frequency relates to a carrier frequency range of 0.4–6 GHz.

4. System according to claim 1, wherein said signal generating arrangement and said signal receiving arrangement are decoupled from each other.

5. System according to claim 1, wherein said processing means are adapted to determine said position by construction or reconstruction of a position determination pattern on the basis of said plurality of received signal strengths.

6. System according to claim 1, wherein said transponder is adapted to insert a further message portion in said further signal comprising additional data.

7. System according to claim 6, wherein said signal generating arrangement is assigned an identification code and adapted to insert said identification code in said magnetic field signal, such that said transponder may employ said identification code as said additional data.

8. System according to claim 6, wherein said transponder comprises at least one sensor for probing at least one variable of and/or concerning an object associated with said transponder, such that said transponder may employ said variable as said additional data.

9. System according to claim 1, wherein the signal strengths of said plurality of signal strengths are associated with irregular time intervals.

10. Transponder being adapted for receiving a substantially stationary magnetic field signal, for determining a plurality of signal strengths of said received magnetic field signal and for transmitting a further signal having inserted at least one message portion indicative of at least one received signal strength.

11. Transponder according to claim 10, wherein said transponder is assigned an identification code and adapted to insert said identification code in a further message portion of said further signal.

12. Transponder according to claim 10, wherein said transponder comprises at least one sensor for probing at least one variable of and/or concerning an object associated with said transponder and is adapted to insert said variable in a further message portion of said further signal.

13. Transponder according to claim 10, wherein said transponder comprises an encryption module for encrypting said further signal.

14. Transponder signal transmitted by a transponder to a signal receiving arrangement in response to reception of a substantially stationary magnetic field signal of a signal generation arrangement, said transponder signal comprising at least one message portion indicative of at least one signal strength of said received magnetic field signal.

15. Transponder signal according to claim 14, wherein said transponder signal further comprises message portions relating to an identification code of said signal receiving arrangement and/or an identification code of said transponder and/or a variable concerning an object associated with said transponder.

16. Transponder signal according to claim 14, wherein said transponder signal is an encrypted transponder signal.

* * * * *